(12) United States Patent
Ball, IV et al.

(10) Patent No.: US 8,470,080 B1
(45) Date of Patent: Jun. 25, 2013

(54) HIGH PRESSURE SEPARATOR

(75) Inventors: Will D. Ball, IV, Bixby, OK (US);
Lester J. Broussard, Tulsa, OK (US);
Lucas C. Broussard, Broken Arrow, OK (US)

(73) Assignees: Shale Oil and Gas Technologies Ltd, Tulsa, OK (US); Midstream Equipment Fabrication LLC, Skiatook, OK (US)

( * ) Notice: Subject to any disclaimer, the term of this patent is extended or adjusted under 35 U.S.C. 154(b) by 0 days.

(21) Appl. No.: 13/402,182

(22) Filed: Feb. 22, 2012

(51) Int. Cl.
*B01D 19/00* (2006.01)

(52) U.S. Cl.
USPC ............ 95/253; 95/24; 96/184; 96/157

(58) Field of Classification Search
USPC .. 95/253, 24; 96/184, 185, 186, 157; 210/537
See application file for complete search history.

(56) References Cited

U.S. PATENT DOCUMENTS

| | | | |
|---|---|---|---|
| 2,685,938 A * | 8/1954 | Walker et al. | 96/165 |
| 2,713,919 A * | 7/1955 | Walker et al. | 95/252 |
| 2,751,998 A * | 6/1956 | Glasgow | 95/24 |
| 3,347,773 A * | 10/1967 | Turner | 204/662 |
| 3,389,536 A | 6/1968 | Bull | |
| 3,708,960 A | 1/1973 | Christopher, Jr. et al. | |
| 3,727,382 A * | 4/1973 | Jackson | 96/174 |
| 4,012,207 A | 3/1977 | Jones | |
| 4,059,517 A * | 11/1977 | Strahorn et al. | 95/253 |
| 4,329,159 A * | 5/1982 | Bull | 204/563 |
| 4,396,404 A * | 8/1983 | Engelman et al. | 95/252 |
| 4,919,777 A * | 4/1990 | Bull | 204/563 |
| 4,995,495 A * | 2/1991 | Krynski | 196/46 |
| 6,673,135 B2 * | 1/2004 | West | 95/268 |
| 6,872,239 B2 * | 3/2005 | Nilsen et al. | 95/30 |
| 7,531,099 B1 * | 5/2009 | Rhodes | 210/800 |
| 8,337,603 B2 * | 12/2012 | Akhras et al. | 96/184 |

* cited by examiner

*Primary Examiner* — Duane Smith
*Assistant Examiner* — Douglas Theisen
(74) *Attorney, Agent, or Firm* — Molly D. McKay

(57) ABSTRACT

A high pressure horizontal vessel separator for separating petroleum mixtures. An inlet on one end of the vessel and gas, water, and oil outlets provided on an opposite end, with each outlet having a vortex breaker. The inlet communicating with a momentum absorbing, flow distributing inlet diverter that causes the gas to separate into the top of the main section of the vessel and the fluids to flow to the bottom of the main section. Sediment collects in the bottom of the main section and is removed via a sand trap. Water remains at the bottom of the vessel, and the fluids flow through a perforated baffle then through a bent lamella demister before entering a settling portion of the vessel where gas and water exit via the gas and water outlets and oil flows over an oil weir and exits downstream of the weir via the oil outlet.

16 Claims, 4 Drawing Sheets

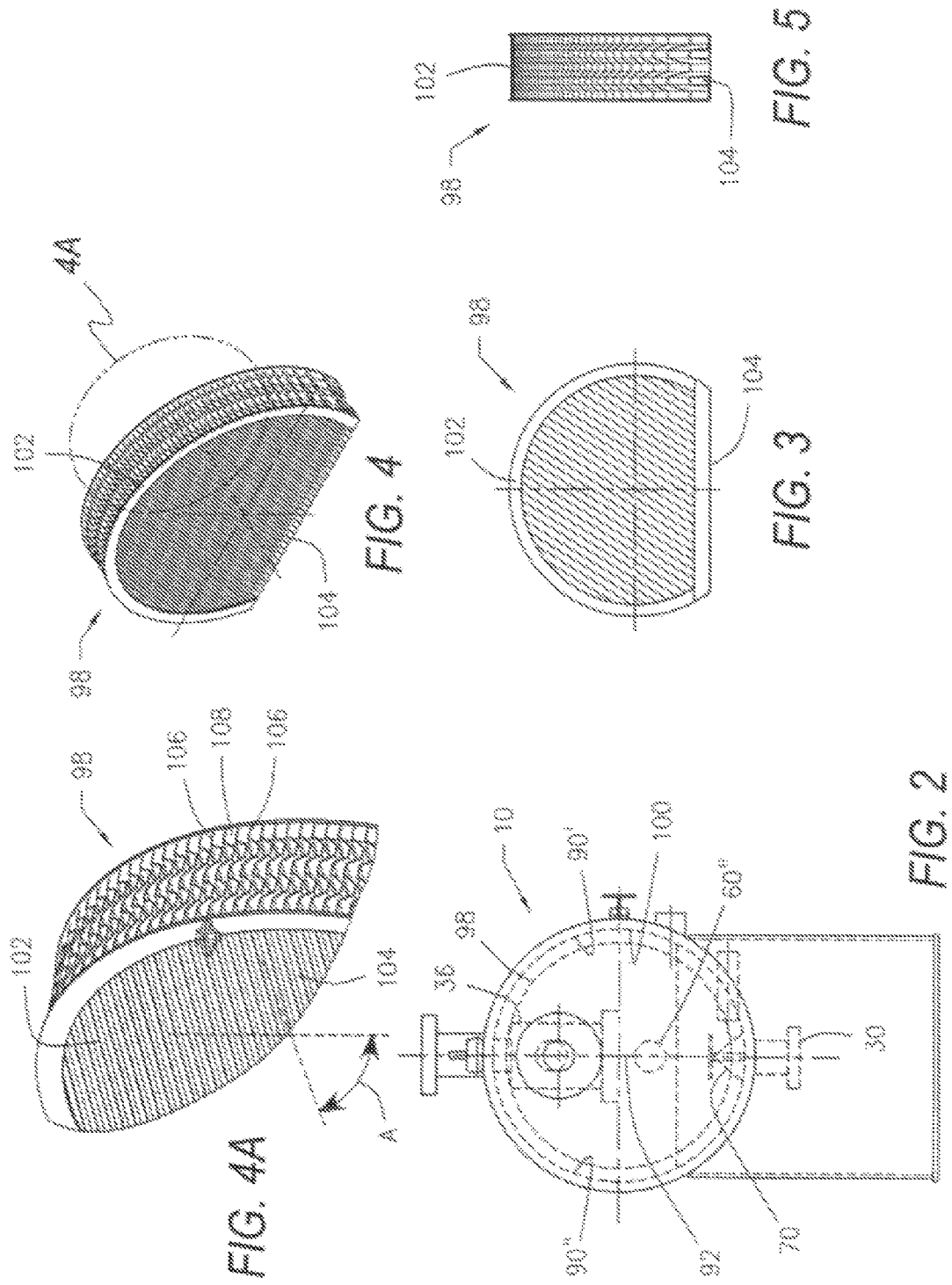

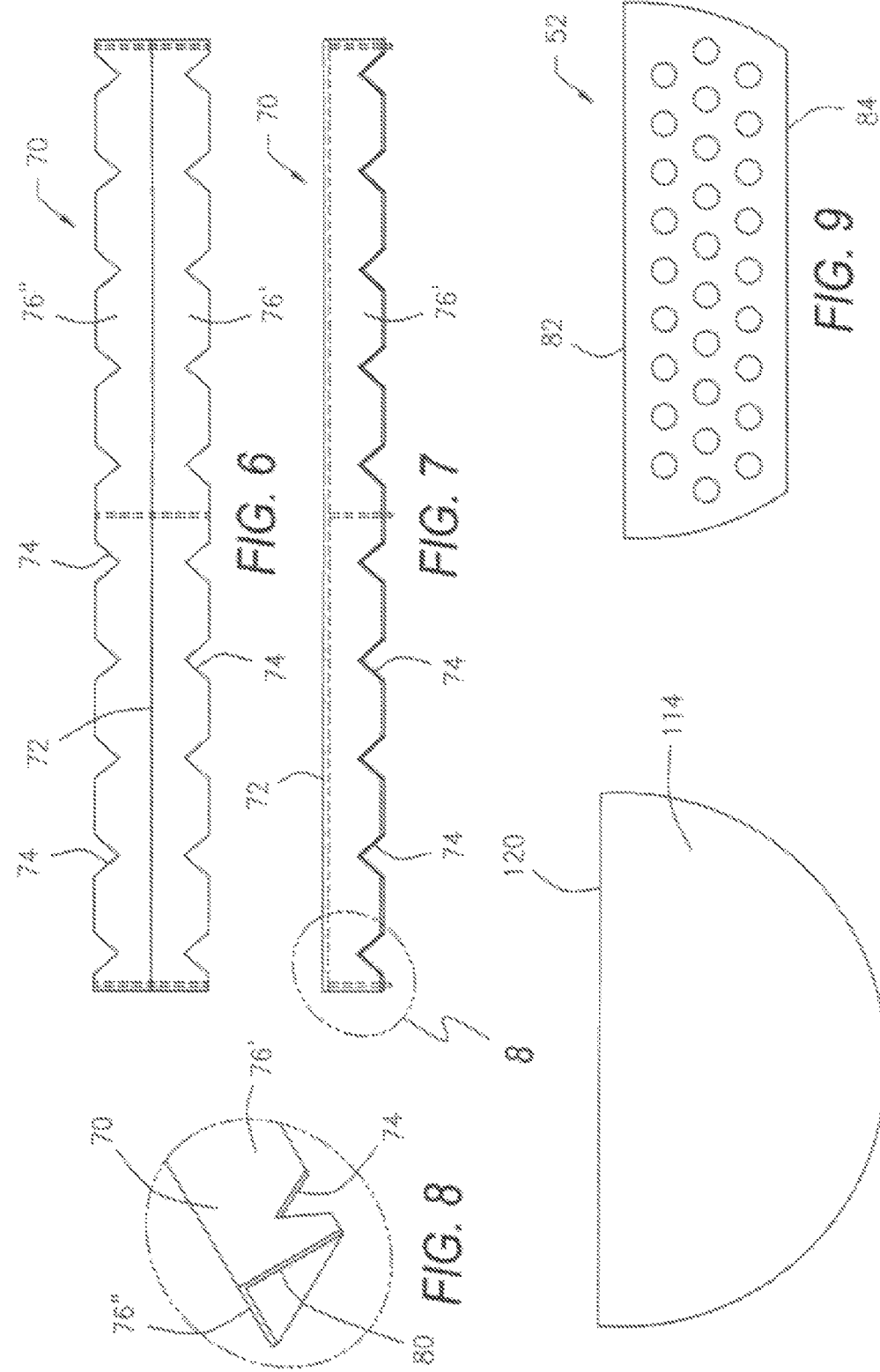

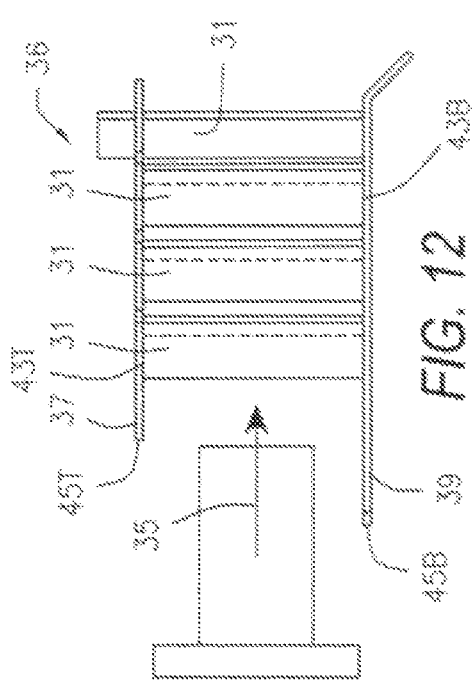
FIG. 12
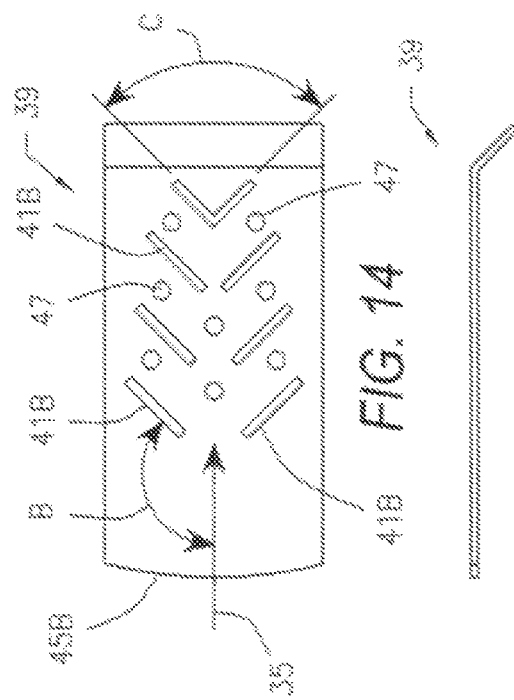
FIG. 14
FIG. 15
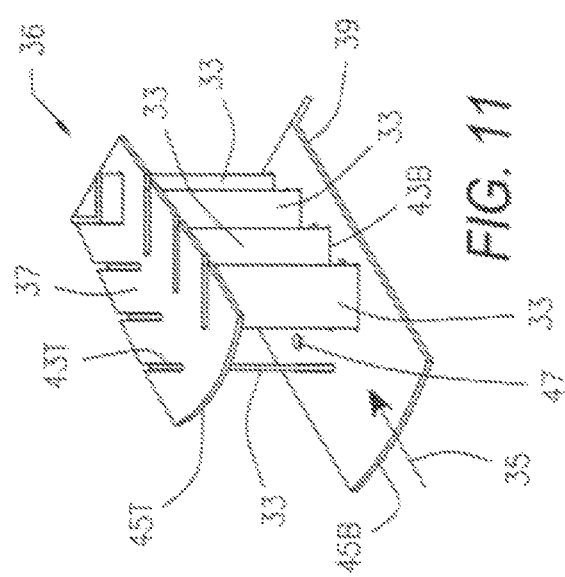
FIG. 11
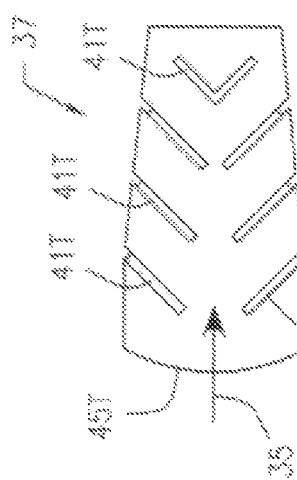
FIG. 13

HIGH PRESSURE SEPARATOR

BACKGROUND OF THE INVENTION

1. Field of the Invention

The present invention relates to an improved high pressure horizontal separator for improved and more complete separation of raw produced oilfield gas, oil, and water. The emphasis of design is primarily for the removal of liquids from natural gas, and secondarily for a more efficient separation of the liquid stream into discrete layers of oil with water and water without oil.

2. Description of the Related Art

Separators for the treatment of oil are well known in the petroleum industry. Gas produced from an oil or gas well will contain oil, water, and sediment. Before the gas and crude oil can be refined, the liquids must be removed from the gas, and the gas, water, and sediment must be removed from the oil.

Separators, as their name implies, function to separate the inlet stream into oil, gas, water, and sediment components. A separator functions to remove the gas from the liquids and sediment, and the sediment and water, commonly referred to as the BS&W, from the oil.

However, several problems exist within the technology employed in current separators that makes them less efficient than desired.

One problem with some separators is that they are oriented in a vertical orientation instead of horizontally. By employing a horizontal vessel with an inlet on one end of the vessel and outlets on an opposite end of the vessel, this allows for longer residence time in the vessel and thus results in better separation.

Another problem with some separators is that they do not provide means for initially separating water from the oil and preventing re-entrainment of the water in the oil and oil in the gas. This makes those separators less efficient, sending valuable oil down the gas line with the gas stream, and valuable oil and gas down the water line with the water, wasting valuable non-renewable resources.

An additional problem with some separators is that their design is not conducive to allowing efficient removal of solids from the vessel. This can lead to silting in of the vessel to the point where separation ceases altogether so that that the vessel must be taken out of service to remove the sediment that has accumulated in the bottom, or be replaced in its entirety.

A further problem with some separators is they do not have good control of the level of the oil-water interface or the oil-gas interface, both of which can result in poor separation, particularly during high instantaneous flow (aka slug) conditions.

Another problem with some separators is that they depend on gravity alone to accomplish the separation of the components.

A further problem with some separators is they generally do not have a means for introducing the incoming fluid into the vessel in such a way that free gas is removed from the incoming stream as it enters the vessel.

Still a further problem with some separators is they introduce the inlet stream into a violent mixing chamber which keeps the fluids entrained in one another, thus reducing separation and separation efficiency.

Another problem with some separators is they do not employ vortex breakers on the exits of the unit which allows the separated fluids to re-mix, cross contaminating the otherwise discrete gas, oil, water and sediment effluent streams.

The present invention addresses these problems and provides a reliable, easily serviceable, and efficient unit for treating petroleum mixtures. This type of separator is general installed upstream of a heater treater in a process or treatment facility.

SUMMARY OF THE INVENTION

The present invention is a separator for treatment of produced petroleum mixtures to separate the gas from liquids and sediment, water from oil, and sediment from gas and liquids. This separator employs a horizontal vessel having an inlet end provided with an inlet into which is introduced the petroleum mixture to be separated. The vessel also has an opposite outlet end provided with a gas outlet, a water outlet and an oil outlet where the separated liquid and gas components are removed from the vessel. Solids and sediment are removed through a dedicated solids removal section in the main portion of the vessel.

The inlet mixed stream enters the vessel at the front or inlet end of the vessel and immediately encounters an inlet diverter that is provided within the vessel on the inlet end of the vessel so that incoming flow encounters the vertical fins or plates of the inlet diverter. The vertical fins or plates divide and divert the flow of the mixture to the sides of the vessel, slowing each portion, so the bulk of the gas is separated from the liquids and sediment which flow downward within the vessel and out of the upper gas layer.

The inlet diverter has bottom openings that allow liquids and solid particles to exit downward and the remaining gases generally are directed by the vertical plates to flow to the sides of the vessel where the liquids impinge on the vessel walls and coalesce, falling downward into the lower liquid portion of the vessel. Upon exiting the inlet diverter and entering the main portion of the vessel, the lighter gas separates and remains in the upward portion of the horizontal vessel. The oil, water, and solids separate from the gas, falling downward into the bottom half of the vessel. The separated oil, being lighter than the water, floats on top of the water. The basic sediment and water (aka BS&W or emulsion), being heavier than oil but lighter than water, floats on top of the water, the water being the heavier liquid, settles to form a lower layer, and the sediment settles to the bottom of the vessel.

Any settleable particles in the inlet stream will settle rapidly to the bottom of the main portion of the vessel due to their comparatively high density, while the gases and light petroleum components flow above them. A dedicated sediment removal system is located here in the main portion of the vessel which extends from the outlet of the inlet diverter on the inlet end of the vessel to a vane section located toward the outlet end.

The vessel includes a temperature gauge, a relief valve, level controls, liquid outlet valves controlled by the level controls, and pressure gauges. A water-oil interface level control and water outlet valve maintain the level of the oil-water interface within the vessel, and a fixed weir spillover baffle maintains the level of the gas-oil interface above the oil-water interface within the main body of the vessel.

An inverted "V" shaped sand withdrawal assembly is located at the bottom of the vessel in the main portion of the vessel as a dedicated means of removing the sedimentary particulate matter that settles at the bottom of the vessel. The sand removal assembly is designed as an inverted "V"-shaped structure that extends longitudinally on the bottom of the vessel. This structure covers the sand and sediment section of the vessel. The structure of the sand assembly is designed with a plurality of triangular or inverted v-shaped cutouts provided on the lower edge of the assembly on either side. Since the horizontal draw efficiency of sediment is limited, one or more blow down drains communicate with the underside of the sand trap as a means of blowing down or removing from the vessel any particulate material that accumulates in and around the sand removal assembly.

A perforated baffle is provided midway in the main portion of the vessel which serves to reflect waves caused by slugs of fluid, and it also re-distributes the liquid flow of fluid throughout the vessel cross section to prevent the natural coning effect which tends to concentrate flow in the center of the vessel as the fluid flows from the inlet to outlet ends of the vessel. The waves are reflected back toward the inlet. The wave reflection and flow redistribution assure that fluid flow downstream of the perforated baffle is as uniform and quiescent as possible, thus promoting more efficient separation.

The demister vane section separates the main portion of the vessel from the settling portion of the vessel. The settling portion of the vessel is located at the outlet end of the vessel. The settling portion of the vessel is bounded on its upstream end by the vane section and on its downstream end by the spillover baffle near the outlet end cap of the vessel.

The settling portion of the vessel is provided with a vane section that extends to the interior wall of the vessel on all sides of the vane section except that the vane section does not extend to the bottom of the vessel. The vane section is composed of tightly packed, specially bent lamella parallel plates oriented at approximately 60° to vertical that serve as a demister for the gas that flows through the top portion of the vane section and as a coalescing device for the oil and water that flow through the lower portions of the vane section.

The bent lamella demister vane section is provided with a plurality of thin plate-like structures or lamellae that are fitted parallel, in modular form, and very close to one another, with open spaces between adjacent lamellae to minimize the likelihood of plugging. The lamellae are oriented at an angle of approximately 60 degrees to perpendicular increasing the contact area between gas and fine mist droplets available for settling. The lamellae are corrugated so that fluid flowing through the vane section follows a tortuous path along the angled corrugated lamellae. Properly designed inclined plate bent plate vanes provide a significant improvement with regard to the efficiency of the separation process while mitigating plugging.

Downstream of the vane section, the remainder of the settling portion of the vessel provides residence time for the separation process to be completed. Separated and demisted gas flows along the top portion of the vessel, around a gas vortex breaker located immediately upstream of the gas outlet before flowing out of the gas outlet nozzle provided at the top of the vessel on the outlet end. Separated water located at the bottom of the vessel flows around a vortex breaker located immediately upstream of the oil spillover baffle and then flows out of the water outlet nozzle provided at the bottom of the vessel on the outlet end and upstream of an oil spillover weir. Oil flows over the oil spillover weir provided at the outlet end of the vessel and into an oil collection reservoir provided downstream of the oil spillover weir and between the oil spillover weir and the outlet end of the vessel. The oil then flows around a vortex breaker located in the oil collection reservoir in association with the oil outlet nozzle before flowing out of the oil outlet nozzle that is provided in the oil collection reservoir.

BRIEF DESCRIPTION OF THE DRAWINGS

FIG. 2 is a front end view of the horizontal separator taken along line 2-2 of FIG. 1 showing the locations of internal components in outline.

FIG. 3 is a front end view of the vane section that is shown in outline in FIG. 1.

FIG. 4 is perspective view of the vane section of FIG. 3.

FIG. 4A is an enlarged view of the area within circle 4A of FIG. 3.

FIG. 5 is side view of the vane section of FIG. 3.

FIG. 6 is a top plan view of the sand trap of FIG. 1.

FIG. 7 is a side view of the sand trap of FIG. 7.

FIG. 8 is an enlarged isometric view of the area enclosed in circle 8 of the sand trap shown in FIG. 7

FIG. 9 is a front end view of the perforated baffle from FIG. 1.

FIG. 10 is a front end view of the oil spillover plate from FIG. 1.

FIG. 11 is a front perspective view of the inlet diverter of FIG. 1.

FIG. 12 is a side view of the inlet diverter of FIG. 11 shown in relationship to the inlet.

FIG. 13 is a top plan view of the top plate of the inlet diverter shown removed from the inlet diverter of FIG. 11.

FIG. 14 is a bottom plan view of the bottom plate of the inlet diverter shown removed from the inlet diverter of FIG. 11.

FIG. 15 is a side view of the bottom plate of FIG. 14.

DETAILED DESCRIPTION OF THE PREFERRED EMBODIMENT

Figure 1:
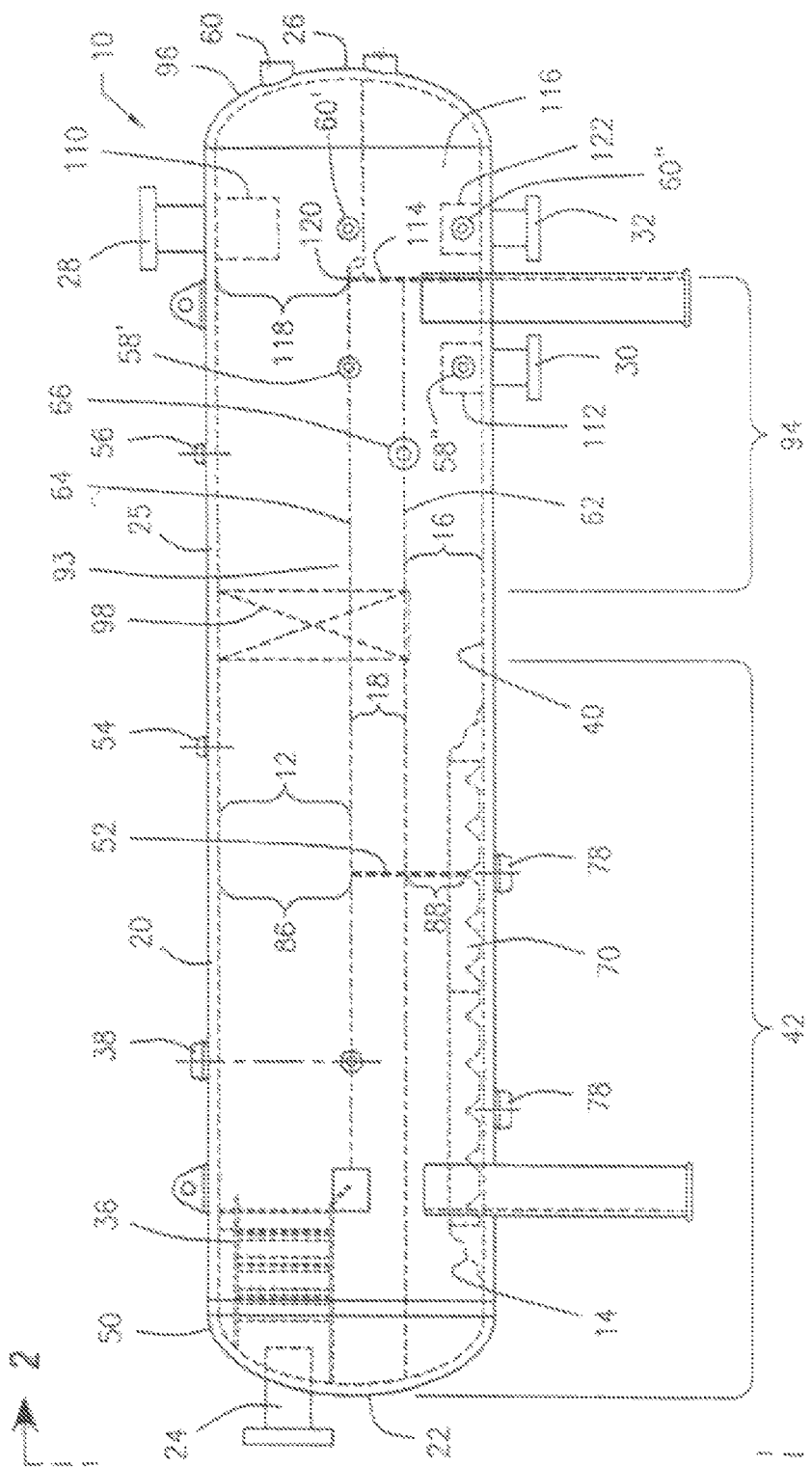
FIG. 1 is a side view of a horizontal separator constructed in accordance with a preferred embodiment of the present invention showing the locations of internal components in outline.

Referring now to FIGS. 1 and 2, there is illustrated a horizontal separator 10 constructed in accordance with a preferred embodiment of the present invention for the treatment of petroleum mixtures such as crude oil without the application of heat internally within the separator 10. The separator 10 is designed to treat petroleum mixtures by separating the gas 12 and the sediment 14 and water 16 from the oil 18. Bottom sediment 14 and water 16 are commonly referred to collectively as BS&W. This separator 10 employs a horizontal tank or vessel 20 having an inlet end 22 provided with an inlet 24 of the vessel 20 into which is introduced the petroleum mixture to be separated. The vessel 20 also has an opposite outlet end 26 provided with a gas outlet 28, a water outlet 30 and an oil outlet 32 where the separated components are removed from the vessel 20. The gas outlet 28 is provided in the top 25 of the vessel 20, and the water outlet 30 and the oil outlet 32 are both provided in the bottom 40 of the vessel 20, as illustrated and as will be more fully explained hereafter.

Referring also to FIGS. 11-15, the inlet 24 communicates with an inlet diverter 36 provided within the vessel 20 on the inlet end 22 of the vessel 20. The inlet diverter 36 is composed of a series of pairs 31 of vertical fins or plates 33 that are provided on either side of the inlet flow path 35 of the petroleum mixture that emanates into the vessel 20 from the inlet 24. Each plate 33 is provided oriented at an angle B of approximately 135 degree from the inlet flow path 35 of the incoming mixture from the inlet 24 so that as the mixture encounters the series of pairs 31 of vertical plates 33, the flow is directed sideways to the sides or walls 100 of the vessel 20. Gas 12 will begin to separate from the liquids 16 and 18, and the liquids 16 and 18 will begin to separate into layers of oil 18 and water 16 upon exiting the inlet diverter 36. The vertical plates 33 are arranged so that the vertical plates 33 of the pairs 31 of plates 33 are spaced closer to their associated plate 33 the further the pairs 31 are located from the inlet 24, with the final pair 31 of plates 33 that are located furthest from the inlet abutting each other and intersecting with each other at approximately a 90 degree angle C.

A top plate 37 and a bottom plate 39 are provided above and below the 31 pairs of vertical plates 33, respectively, to hold the vertical plates 33 in position. The top and bottom plates 37 and 39 are provided with slots 41T and 41B for receiving and holding the top and bottom edges, 43T and 43B respectively, of each of the vertical plates 33. Front edges, 45T and 45B respectively, of the top and bottom plates 37 and 39 are contoured to attached to the inside wall 100 or the inlet flange 50 of the vessel 10 at the inlet end 22 of the vessel 20 in association with the inlet 24. The bottom plate 39 is also provided with openings 47 through which liquids in the form of water 16 and oil 18 and also sediment or solids 14 that are separated from the incoming gaseous mixture can move easily downward, exiting the inlet diverter 36 and moving into the main portion 42 of the vessel.

Upon leaving the diverter 36, any separated water 16 and settleable sediment or particles 14 in the oil 18 or water 16 will sink to the bottom 40 of the vessel 20 within the main portion 42 of the vessel 20, while the gas 12 will rise to the top 25 of the vessel 20. Separated oil 18 and mixtures of water and oil 16 and 18 or oil and gas 18 and 12 remain in the middle 92 of the vessel 20 within the main portion 42 of the vessel 20. The middle 92 of the vessel 20 is located between the top 25 and the bottom 40 of the vessel 20.

The main portion 42 of the vessel 20 extends from the inlet end 22 of the vessel 10 to the vane section 98. The main portion 42 is bounded on its upstream end or inlet end 22 of the vessel 20 by the welded inlet end 50 of the vessel 20 and is bounded on the outlet end 26 of the vessel 20 by the vane section 98 which is located approximately midway between the two ends 22 and 26 of the vessel 20.

An oil-water interface 62 and a gas-oil interface 64 are maintained within the vessel at desired levels. Level controls 66 maintain the oil-water interface 62 and an oil weir 114 and removal of gas 12 from the vessel 20 control the gas-oil interface 64. The vessel 20 also includes a temperature gauge and a relief valve (not illustrated) located at port 38 within the main portion 42.

A sand trap 70 and a perforated baffle 52 are located within the main portion 42 of the vessel 20.

Referring to FIGS. 1, and 6-8, the sand trap 70 is located at the bottom 40 of the vessel 20 in the main portion 42 of the vessel 20 as a means of removing sediment 14 or particulate matter that settles to the bottom 40 of the vessel 20. The sand trap 70 is designed with an inverted v-shaped cover 72 that extends longitudinally on the bottom 40 of the vessel 20. The cover 72 is provided with a plurality of triangular or inverted v-shaped cutouts 74 provided in the cover 72 on either side 76' and 76" of the cover 72 so that the cutouts 74 are adjacent the bottom 40 of the vessel 20. One or more sediment blow down drains 78 communicate with the underside 80 of the sand trap 70 as a means of blowing down any sediment 14 that accumulates in and around the sand trap 70.

Referring to FIGS. 1 and 9, the perforated baffle 52 does not extend to the top 25 or to the bottom 40 of the vessel 20 on its top and bottom edges 82 and 84. A gas gap 86 formed between the top edge 82 of the baffle 52 and the top 25 of the vessel 20 allows separated gas 12 to flow over the top of edge 82 of the perforated baffle 52. A water gap 88 formed between the bottom edge 84 of the baffle 52 and the bottom 40 of the vessel 20 allows separated water 16 to flow undisturbed under the bottom edge 84 of the perforated baffle 52.

The perforated baffle 52 serves to equalize the flow of oil 18 at the sides 90' and 90" of the vessel 20 with that occurring in the center 92, i.e. midway between the sides 90' and 90" of the vessel 20 as the fluid flows from the inlet end 22 to the opposite outlet end 26 of the vessel 20 and before the flow reaches the vane section 98.

The vane section 98 separates the main portion 42 of the vessel 20 from a settling portion 94 of the vessel 20 which is located at the outlet end 26 of the vessel 20. The settling portion 94 of the vessel 20 is bounded on its upstream end by the vane section 98 and on its downstream end by the outlet end cap or flange 96 of the vessel 20.

Both the inlet end cap 50 and the outlet end cap 96 are welded in place at either end of the vessel 20.

Referring now to FIGS. 1 and 3-5, the vane section is provided at the interface between the main portion 42 of the vessel 20 and the settling portion 94 of the vessel 20. The top or upper portion 102 of the vane section 98 extends to the wall 100 of the vessel 20 on the top 25 and the vane section 98 extends to both sides 90' and 90" of the vessel 20, with the bottom 104 of the vane section 98 not extending all the way to the bottom 40 of the vessel 20. All the gas 12 and all the liquids, i.e. oil 18 and water 16, that are located within roughly the upper three fourths of the vessel 20 and that are flowing from the main portion 42 of the vessel 20 to the outlet end 26 of the vessel 20 must pass through the vane section 98.

The vane section 98 is preferably a bent lamella separator 98 that serves as a demister for the gas 12 that flows through a top or upper portion 102 of the vane section 98 and as a coalescing device for the oil 18 and water 16 that flow through the bottom or lower portion 104 of the vane section 98. Water that has already separated from the mixture passes under the vane section 98.

The bent lamella separator 98 is provided with a plurality of thin plate-like structures or lamellae 106 that are fitted parallel, in modular form, and very close to one another, with open spaces 108 between adjacent lamellae 106. The lamellae 106 are oriented at an angle A of approximately 60 degrees to perpendicular which serves to increase the surface area available for separation and settling. The lamellae 106 are corrugated so that fluid flowing through the vane section 98 follows a tortuous path along the angled corrugated lamellae 106. Lamella separators 98 provide a significant improvement with regard to the efficiency of the separation process.

An upstream pressure gauge 54 is provided within the main portion 42 upstream of the vane section 98, and a downstream pressure gauge 56 is provided within the settling portion 94 downstream of the vane section 98 so that differential pressure across the vane section 98 can be monitored as a means of determining if the vane section 98 has become plugged.

Downstream of the vane section 98, the settling portion 94 of the vessel 20 provides residence time for the separation process to be completed. Separated gas 12 located at the top 25 of the vessel 20 flows around a gas vortex breaker 110 located immediately upstream of the gas outlet 28 before flowing out of the gas outlet 28 provided at the top 25 of the vessel 20 on the outlet end 26. Separated water 16 located at the bottom 40 of the vessel 20 flows around a water vortex breaker 112 located in association with the water outlet 30 before flowing out of the water outlet 30 provided at the bottom 40 of the vessel 20 on the outlet end 26 immediately upstream of an oil spillover weir 114.

In order to monitor levels within the settling portion 94 of the vessel, a sight glass (not shown) is provided attached to sight glass ports 58' and 58".

As shown in FIGS. 1 and 10, the oil spillover weir 114 extends to the wall 100 of the vessel 20 on the bottom 40 and both sides 90' and 90" of the vessel 20, but does not extend to the top 25 of the vessel 20. An oil gap 118 is formed between a top edge 120 of the oil spillover weir 114 and the top 25 of the vessel 20. An oil collection compartment 116 is formed on the downstream side of the weir 114 and is located between the weir 114 and the outlet end 26 of the vessel 20.

Oil 18 from the settling portion 94 of the vessel 20 flows over the top edge 120 of the oil spillover weir 114 and through the oil gap 118 into the oil collection compartment 116. The oil 18 from the oil collection compartment 116 then travels around an oil vortex breaker 122 located in association with the oil outlet 32 before flowing out of vessel 20 via the oil outlet 32 that is provided in the bottom of the oil collection compartment 116. In order to monitor oil level within the oil collection compartment 116 of the vessel 20, a sight glass (not shown) is provided attached to sight glass ports 60' and 60". A high level switch (not illustrated) is also provided at sight glass port 60 to insure that the oil level within the vessel 20 remains below the gas vortex breaker 110.

While the invention has been described and illustrated with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A high pressure horizontal separator for separating petroleum mixtures comprising:
    a horizontal vessel provided with an inlet on an inlet end of the vessel for receiving a petroleum mixture,
    a main portion of the vessel provided adjacent the inlet end,
    a momentum absorbing and flow distributing inlet diverter provided at the inlet end in association with the inlet that causes gas to separate into a top of the main portion of the vessel and causes fluids and sediments to flow to a bottom of the main portion,
    a sand trap provided in the bottom of the main portion of the vessel to remove sediments, at least one sediment blow down drain provided under the sand trap for removing sediments from the vessel, a perforated baffle provided in the main portion for equalizing flow in the middle of the vessel,
    said vessel provided with an opposite outlet end, a bent lamella separator provided between the main portion of the vessel and a settling portion of the vessel located toward the outlet end of the vessel, a water outlet provided at a bottom of the settling portion of the vessel and a gas outlet provided at a top of the settling portion of the vessel,
    an oil weir provided at the outlet end of the settling portion of the vessel and separating the settling portion from an oil collection compartment located at the outlet end of the vessel, and an oil outlet provided at a bottom of the oil collection compartment, and
    a vortex breaker provided in association with each outlet.

2. A high pressure horizontal separator for separating petroleum mixtures according to claim 1 wherein the momentum absorbing and flow distributing inlet diverter further comprises:
    pairs of vertical plates provided in association with the inlet such that the pairs of vertical plates divert all of the flow from the inlet sideways toward the sides of the vessel.

3. A high pressure horizontal separator for separating petroleum mixtures according to claim 2 wherein the momentum absorbing and flow distributing inlet diverter further comprises:
    each vertical plate of the pairs of vertical plates oriented at an angle of approximately 135 degrees from the inlet flow path of the incoming mixture entering the vessel through the inlet.

4. A high pressure horizontal separator for separating petroleum mixtures according to claim 3 wherein the momentum absorbing and flow distributing inlet diverter further comprises:
    a horizontal top plate with slots for receiving a top edge of each vertical plate of the pairs of vertical plates, a horizontal bottom plate with slots for receiving a bottom edge of each vertical plate of the pairs of vertical plates, openings provided in the horizontal bottom plate to allow condensed liquids and sediment to pass downward into the main portion of the vessel, and
    said top plate secured above the inlet to an inlet end cap provided at the inlet end of the vessel and said bottom plate secured below the inlet to the inlet end cap so that the vertical plates that are held between the top and bottom plates are aligned with an inlet flow path of petroleum mixture entering the vessel via the inlet.

5. A high pressure horizontal separator for separating petroleum mixtures according to claim 4 wherein the momentum absorbing and flow distributing inlet diverter further comprises:
    vertical plates of each pair of vertical plates are provided on either side of the inlet flow path of the petroleum mixture entering the vessel via the inlet, the vertical plates are arranged so that the vertical plates of the pairs of plates are spaced closer to their associated plate the further the pairs are located from the inlet, vertical plates of a final pair of plates located furthest from the inlet abut and intersecting with each other at approximately a right angle.

6. A high pressure horizontal separator for separating petroleum mixtures comprising:
    a horizontal vessel with an inlet end and an opposite outlet end of the vessel, said vessel divided into a main portion on the inlet end where initial separation occurs and a settling portion on the outlet end that provides residence time for the water and oil to separate,
    an inlet to the vessel provided at the inlet end of the vessel, said inlet communicating with a momentum absorbing and flow distributing inlet diverter that causes gas to separate into a top of the main portion of the vessel and causes fluids and sediments to flow to a bottom of the main portion,
    a perforated baffle provided in the main portion of the vessel so that the baffle equalizes flow of oil at the sides and the middle of the vessel as the fluid flows through the main portion of the vessel,
    a sand trap located at the bottom of the vessel in the main portion of the vessel as a means of removing sediment from the vessel,
    a vane section located between the main portion and the settling portion of the vessel, said vain section extending to the walls of the vessel at the top and on both sides so that gas and oil flowing from the main portion to the settling portion of the vessel pass through the vane section, said vane section provided with spaced apart corrugated plates separated from each other and oriented at an angle so that the vane section serves as a demister for the gas that flows through it and serves as a coalescing device for the oil that flows through it,
    a water outlet provided in the bottom of the vessel at the downstream end of the settling portion, a gas outlet provided in the top of the vessel at the outlet end, an oil spillover weir provided at the outlet end of the vessel and extending to the wall of the vessel on the bottom and both sides of the vessel so that an oil gap is formed between a top edge of the oil spillover weir and the top of the vessel, an oil collection compartment located on the downstream side of the weir between the weir and the outlet end of the vessel, and an oil outlet provided in a bottom of the oil collection compartment.

7. A high pressure horizontal separator for separating petroleum mixtures according to claim 6 further comprising:
level controls provided in association with the vessel to maintain the level of a gas-oil interface within the vessel and to maintain the level of oil-water interface within the vessel.

8. A high pressure horizontal separator for separating petroleum mixtures according to claim 6 further comprising:
an inverted v-shaped cover provided on the sand trap, said cover extending longitudinally on the bottom of the vessel, said cover provided with a plurality of triangular cutouts on either side of the cover, and
at least one sediment blow down drain communicating with an underside of the sand trap to provided a place where sediment can be blown out of the vessel.

9. A high pressure horizontal separator for separating petroleum mixtures according to claim 6 further comprising:
said perforated baffle having a top edge that is spaced apart from the top of the vessel to form a gas gap there between through which gas flows through the main portion of the vessel, and
said perforated baffle having a bottom edge that is spaced apart from the bottom of the vessel to form a water gap there between through which water flows through the main portion of the vessel.

10. A high pressure horizontal separator for separating petroleum mixtures according to claim 6 further comprising:
said settling portion of the vessel is bounded on its upstream end by the vane section and bounded on its downstream end by an oil spillover weir provided at the outlet end of the vessel, said oil spillover weir extending to the wall of the vessel on the bottom and both sides of the vessel so that an oil gap is formed between a top edge of the oil spillover weir and the top of the vessel, an oil collection compartment located on the downstream side of the weir between the weir and an outlet end cap provided at the outlet end of the vessel.

11. A high pressure horizontal separator for separating petroleum mixtures according to claim 6 wherein the vane section further comprises:
a series of angular bent parallel plates oriented to form a lamella separator.

12. A high pressure horizontal separator for separating petroleum mixtures according to claim 6 wherein the vane section further comprises:

a bent lamella separator provided with a plurality of thin plate-like lamellae that are fitted in parallel modular form very close to one another with open spaces between adjacent lamellae, said lamellae are oriented at an angle of approximately 60 degrees to perpendicular, and said lamellae are angularly corrugated.

13. A high pressure horizontal separator for separating petroleum mixtures according to claim 6 further comprising:
a gas vortex breaker located immediately upstream of and covering the gas outlet.

14. A high pressure horizontal separator for separating petroleum mixtures according to claim 6 further comprising:
a water vortex breaker provided in association with and covering the water outlet.

15. A high pressure horizontal separator for separating petroleum mixtures according to claim 6 further comprising:
an oil vortex breaker provided in association with and covering the oil outlet.

16. A method for treating petroleum mixtures comprising the following steps:
introducing a petroleum mixture to be separated into a momentum absorbing and flow distributing inlet diverter of a high pressure horizontal separator that is constructed in accordance with claim 1,
causing gas that separates from the petroleum mixture in the inlet diverter to pass to the top of a main portion of the separator,
causing the remaining petroleum mixture to exit the inlet diverter into the main portion of the vessel,
allowing sediment to fall to the bottom of the separator where it is removed from vessel via a sand trap,
allowing water contained within the remaining petroleum mixture to begin separating from the oil, with the separated water flowing to the bottom of the vessel,
allowing the separated oil to rise within the vessel,
passing the oil through a perforated redistribution baffle to equalize flow between the main and settling portions of the separator as the oil flows through the vessel,
passing the gas and oil through an angularly oriented corrugated lamella vane section which serves as a demister for the gas that flows through the top portion of the vane section and as a coalescing device for the oil that flows through the lower portions of the vane section,
providing residence time in the settling portion of the separator to allowing completion of the separation of the gas, oil and water,
removing the gas from the settling portion of the separator after passing it around a gas vortex breaker, removing the water from the settling portion of the separator after passing around a water vortex breaker,
allowing the oil to spill over a fixed oil weir into an oil collection reservoir located on the downstream side of the weir, and
removing the oil from the oil collection reservoir of the separator after passing it around an oil vortex breaker.

* * * * *